United States Patent
Masuda

(10) Patent No.: US 10,358,327 B2
(45) Date of Patent: Jul. 23, 2019

(54) WET BRAKE

(71) Applicant: KABUSHIKI KAISHA TOYOTA JIDOSHOKKI, Kariya-shi, Aichi-ken (JP)

(72) Inventor: Hideo Masuda, Aichi-ken (JP)

(73) Assignee: KABUSHIKI KAISHA TOYOTA JIDOSHOKKI, Kariya-shi, Aichi-ken (JP)

( * ) Notice: Subject to any disclaimer, the term of this patent is extended or adjusted under 35 U.S.C. 154(b) by 0 days.

(21) Appl. No.: 15/946,938

(22) Filed: Apr. 6, 2018

(65) Prior Publication Data

US 2018/0290870 A1    Oct. 11, 2018

(30) Foreign Application Priority Data

Apr. 11, 2017   (JP) ................. 2017-078466

(51) Int. Cl.
*B60T 1/06* (2006.01)
*B60K 17/04* (2006.01)
(Continued)

(52) U.S. Cl.
CPC ........ *B66F 9/07509* (2013.01); *B60K 17/046* (2013.01); *B60K 17/16* (2013.01); *B60T 1/065* (2013.01); *F16D 55/39* (2013.01); *F16J 15/28* (2013.01); *F16D 55/40* (2013.01); *F16D 55/42* (2013.01); *F16D 65/0971* (2013.01);
(Continued)

(58) Field of Classification Search
CPC ... B66F 9/07509; B60K 17/046; B60K 17/16; F16J 15/28; B60T 1/065; F16D 65/0971; F16D 65/853; F16D 55/39; F16D 55/40; F16D 65/186; F16D 2121/06;
(Continued)

(56) References Cited

U.S. PATENT DOCUMENTS

| 7,861,831 B2 * | 1/2011 | Chung ................ B66F 9/07509 188/71.5 |
| 10,065,455 B2 * | 9/2018 | Chung ................ B60B 35/125 |

(Continued)

FOREIGN PATENT DOCUMENTS

| JP | 2001-193774 A | 7/2001 |
| JP | 2007-120559 A | 5/2007 |

(Continued)

*Primary Examiner* — Pamela Rodriguez
(74) *Attorney, Agent, or Firm* — Sughrue Mion, PLLC

(57) ABSTRACT

A wet brake includes a housing, non-rotatable brake discs, rotatable brake discs, a parking lever, a piston, a plate, and a connector. The non-rotatable and the rotatable brake discs are disposed in engagement with the housing and an outer peripheral surface of a rotary shaft, respectively. The piston, the plate, and the rotary shaft are accommodated in the housing. The piston is configured to be pushed by the parking lever toward the non-rotatable and the rotatable brake discs. The plate is in contact with one of the non-rotatable brake discs or one of the rotatable brake discs. The connector is disposed at a position between the piston and the plate. The housing has a recess that is formed in an outer peripheral surface of the housing at a position corresponding to the position of the connector. An outer diameter of the connector is smaller than that of the piston.

3 Claims, 4 Drawing Sheets

(51) Int. Cl.
*B60K 17/16* (2006.01)
*B66F 9/075* (2006.01)
*F16D 55/00* (2006.01)
*F16D 55/39* (2006.01)
*F16D 55/40* (2006.01)
*F16D 55/42* (2006.01)
*F16D 65/18* (2006.01)
*F16J 15/28* (2006.01)
*F16D 121/04* (2012.01)
*F16D 121/06* (2012.01)
*F16D 121/14* (2012.01)
*F16D 123/00* (2012.01)
*F16D 65/097* (2006.01)
*F16D 65/853* (2006.01)

(52) U.S. Cl.
CPC .......... *F16D 65/186* (2013.01); *F16D 65/853* (2013.01); *F16D 2055/0033* (2013.01); *F16D 2055/0058* (2013.01); *F16D 2121/04* (2013.01); *F16D 2121/06* (2013.01); *F16D 2121/14* (2013.01); *F16D 2123/00* (2013.01)

(58) Field of Classification Search
CPC .............. F16D 2121/04; F16D 2121/14; F16D 2103/00; F16D 2055/0033
USPC .................. 188/71.4, 71.1, 72.6, 73.1, 73.31; 475/116, 311, 331
See application file for complete search history.

(56) References Cited

U.S. PATENT DOCUMENTS

| | | | |
|---|---|---|---|
| 2005/0009663 A1* | 1/2005 | Kingston | B60K 17/046 475/331 |
| 2007/0219043 A1* | 9/2007 | Moon | B60K 17/046 475/311 |
| 2010/0012447 A1 | 1/2010 | Sakahara | |
| 2011/0275468 A1* | 11/2011 | Fujimoto | B60K 17/046 475/116 |
| 2013/0056289 A1 | 3/2013 | Shibukawa et al. | |

FOREIGN PATENT DOCUMENTS

| JP | 2009-150486 A | 7/2009 |
|---|---|---|
| JP | 2013-053711 A | 3/2013 |

* cited by examiner

WET BRAKE

BACKGROUND ART

The present disclosure relates to a wet brake.

Japanese Unexamined Patent Application Publication No. 2007-120559 mentions the well-known art for wet brakes. A wet brake mentioned in the above-mentioned publication includes a plurality of friction plates, a plurality of brake plates, a thrust member, and a parking brake piston. The plurality of friction plates are supported by a spline member that is secured to an inner periphery of a reduction gear box. The friction plates are movable in an axial direction of the spline member, but not rotatable. The plurality of the brake plates is supported by a spline ring that is splined to an outer periphery of a sun gear axle. The brake plates are movable in the axial direction of the spline member, but not rotatable. Each brake plate is interposed between any two adjacent friction plates. The thrust member has an annular plate shape, and is configured to contact with an innermost one of the friction plates with respect to a vehicle to which the wet brake is mounted. The parking brake piston is disposed inward of the thrust member, and is configured to push the thrust member outward with reference to the vehicle in response to a pressing operation of the parking brake. The thrust member is moved to press the friction plates to the brake plates, which applies a brake to the sun gear axle.

For example, in a forklift truck including a mast and a mast support provided to a bottom part of the mast, a wet brake may be mounted to the mast support in such a manner that a mounting groove formed in an outer peripheral surface of a housing of the wet brake receives the mast support of the mast. In this wet brake, one way of achieving a desired braking force is to expand an outer diameter of a piston included in the wet brake to increase an area of contact between the piston and a brake disc that is pushed by the piston. However, this way requires extending a distance between the mounting groove and a rotary shaft that is disposed in the piston to secure a necessary wall thickness of the housing, which results in a dimensional change of the mast support (i.e., a mounted object) and therefore a design change of the mast itself.

The present disclosure, which has been made in light of the above described problem, is directed to providing a wet brake wherein a change in an outer diameter of a piston is allowed without making any influence on design of a mounted object.

SUMMARY

In accordance with one aspect of the present disclosure, a wet brake for restraining rotation of a rotary shaft that includes a housing, a plurality of non-rotatable brake discs and a plurality of rotatable brake discs, a parking lever, a piston, a plate, and a connector is provided. The housing has a recess that is configured to receive a mounted object, and accommodates the rotary shaft. The non-rotatable brake discs are disposed in engagement with the housing. The rotatable brake discs are disposed in engagement with an outer peripheral surface of the rotary shaft. The rotatable brake discs are interleaved with the non-rotatable brake discs in an axial direction of the rotary shaft, and cooperate with the non-rotatable brake discs to form a disc stack. The piston and the plate are accommodated in the housing. The piston is configured to be pushed by the parking lever toward the non-rotatable and the rotatable brake discs. The plate is disposed in contact with one of the non-rotatable brake discs or one of the rotatable brake discs. The non-rotatable brake disc or the rotatable brake disc forms one end of the disc stack adjacent to the piston. The connector has a cylindrical shape and is disposed at a position between the piston and the plate. The recess is formed in an outer peripheral surface of the housing at a position corresponding to the position of the connector. An outer diameter of the connector is smaller than an outer diameter of the piston.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure together with objects and advantages thereof, may best be understood by reference to the following description of the presently preferred embodiments together with the accompanying drawings in which.

DETAILED DESCRIPTION OF THE EMBODIMENTS

Figure 1:
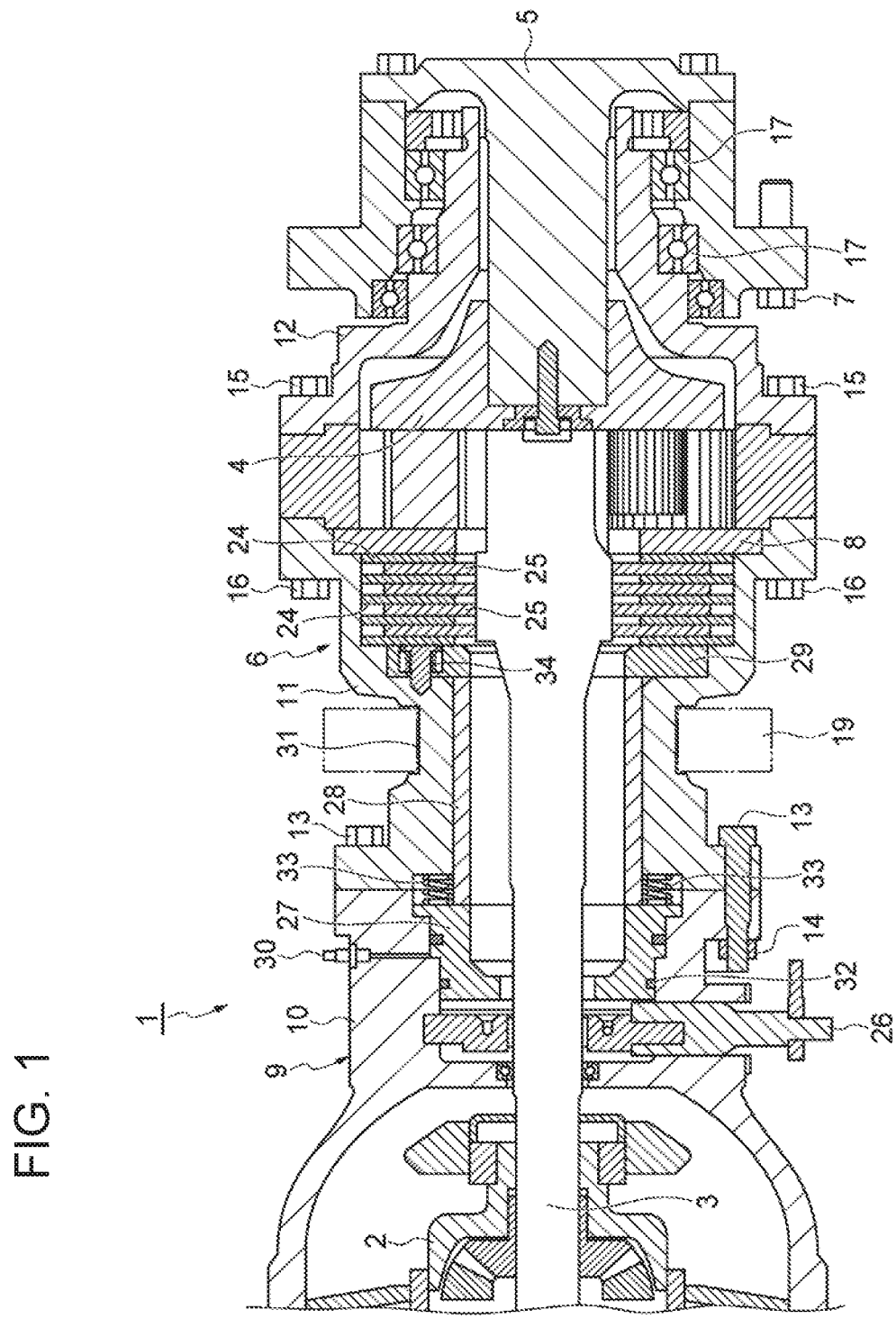
FIG. 1 is a fragmentary sectional view of a drive device having a wet brake according to an embodiment of the present disclosure.

The following will describe an embodiment of the present disclosure with reference to the accompanying drawings. In the description, identical or substantially identical components have the same reference numerals and may not be reiterated.

FIG. 1 is a fragmentary sectional view of a drive device having a wet brake according to the embodiment of the present disclosure. A drive device 1 shown in FIG. 1 is, for example, mounted to a forklift truck. The drive device 1 is a device to drive and rotate a wheel (not shown) of a forklift truck. The following description will focus on one of right and left parts of the drive device 1 as shown in FIG. 1.

Referring to FIG. 1, the drive device 1 has a differential 2, a rotary shaft (i.e., an axle shaft 3), a reduction gear 4, a hub 5, and a wet brake 6. The axle shaft 3 is connected to the differential 2. The reduction gear 4 is configured to reduce a rotational speed of the axle shaft 3 to output a lower rotational speed of the axle shaft 3. The hub 5 is mounted to the reduction gear 4. The wet brake 6 is configured to restrain rotation of the axle shaft 3 to apply a brake to a wheel.

The reduction gear 4, which is not elaborated herein, has a planetary gear mechanism including, for example, a sun gear, planetary gears, a planetary carrier, and an internal gear. The wheel (not shown) is secured to the hub 5 by a hub bolt 7. The wet brake 6 is disposed between the differential 2 and the reduction gear 4. A retainer 8 is disposed between the reduction gear 4 and the wet brake 6. The axle shaft 3, the reduction gear 4, and the retainer 8 are accommodated in a housing 9.

The housing 9 includes first to third housing members, which, in this embodiment, are housing members 10 to 12, such that the housing 9 is dividable into the housing members 10 to 12. The housing members 10 to 12 are arranged in this order in an axial direction of the axle shaft 3 (i.e., the rotary shaft) toward an outer end of the axle shaft 3 with respect to the forklift truck. The housing members 10 and 11 are secured to each other by a plurality of sets of a bolt 13 and a nut 14. The housing members 11 and 12 are secured to each other by a plurality of sets of a bolt 15 and a nut 16. The reduction gear 4 is accommodated in the housing member 12. A plurality of bearings 17 is disposed between the housing member 12 and the hub 5.

Figure 2:
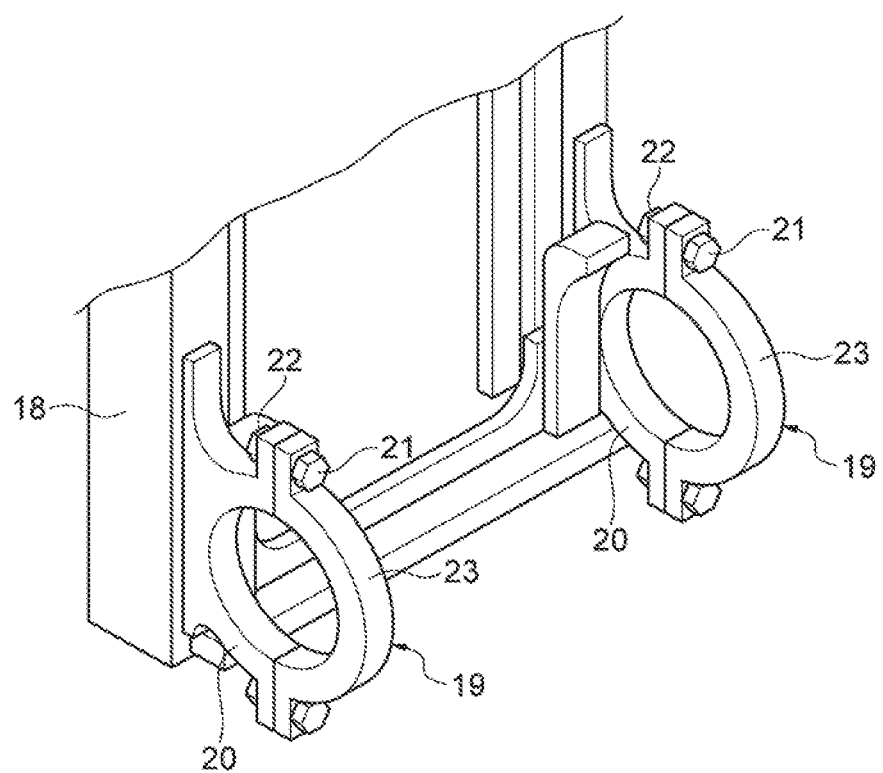
FIG. 2 is a perspective view of a mast to which the drive device is mounted of FIG. 1.

The drive device 1 having the wet brake 6 is attached to a mounted object, which, in this embodiment, is a left and right pair of mast supports 19 shown in FIG. 2. As shown in FIG. 2, each mast support 19 has an approximately ring shape and is provided to a bottom part of a mast 18 of the forklift truck. The mast support 19 includes a base portion 20 and a holding member 23. The base portion 20 has an approximately semi-ring shape and protrudes from the bottom part of the mast 18. The holding member 23 has an approximately semi-ring shape and is secured to the base portion 20, for example, by two sets of a bolt 21 and a nut 22. The following description will explain one of the mast supports 19 with reference to FIG. 1.

As shown in FIG. 1, the wet brake 6 in this embodiment includes the above-described housing member 10 (i.e., the first housing member) and the housing member 11 (i.e., the second housing member), a plurality of disc-shaped non-rotatable brake discs 24, and a plurality of disc-shaped rotatable brake discs 25, a parking lever 26, a piston 27, a cylindrical connector 28, and an annular plate 29. The axle shaft 3 penetrates through the parking lever 26, the piston 27, the connector 28, and the plate 29.

The housing member 10 has an oil inlet 30 for allowing entry of brake fluid to operate the piston 27. The housing member 10 has an air vent (not shown) to release air from the housing member 10. The housing member 11 has a recess, which, in this embodiment, is a mounting groove 31 that has an annular shape and is formed in an outer peripheral surface of the housing member 11 at a position corresponding to a position of the connector 28, so that the mounting groove 31 is configured to receive the mast support 19.

The non-rotatable brake discs 24 are disposed in engagement with, specifically, are splined to, an inner peripheral surface of the housing member 11 such that the non-rotatable brake discs 24 are movable in the axial direction of the axle shaft 3. The rotatable brake discs 25 are disposed in engagement with, specifically, are splined to, an outer peripheral surface of the axle shaft 3 such that the rotatable brake discs 25 are movable in the axial direction of the axle shaft 3. Each rotatable brake disc 25 is disposed between any two adjacent non-rotatable brake discs 24. That is, the rotatable brake discs 25 are interleaved with the non-rotatable brake discs 24 in the axial direction of the axle shaft 3, and cooperate with the non-rotatable brake discs 24 to form a disc stack. In this embodiment, one of the non-rotatable brake discs 24 forms one end of the disc stack adjacent to the retainer 8. However, one of the rotatable brake discs 25 may form the end of the disc stack adjacent to the retainer 8. In other words, in this embodiment, the retainer 8 is located adjacent to the non-rotatable brake disc 24 in the axial direction of the axle shaft 3. However, the retainer 8 may be located adjacent to the rotatable brake disc 25 in the axial direction of the axle shaft 3.

The parking lever 26 is connected by a cable to a parking brake that is disposed in a driver's section. The parking brake and the cable are not shown in the drawings.

The piston 27 is accommodated in the housing member 10. The piston 27 is configured to be pushed by hydraulic pressure or the parking lever 26 toward the non-rotatable and the rotatable brake discs 24, 25, in other words, toward the outer end of the axle shaft 3. The piston 27 has a cylindrical shape and is comprised of a metal. The piston 27 has a stepped outer peripheral surface such that an outer diameter of the piston 27 is expanded stepwise (in three steps in this embodiment) toward the outer end of the axle shaft 3. The housing member 10 has a stepped inner peripheral surface that conforms to the stepped outer peripheral surface of the piston 27. A plurality of seal rings 32 (two seal rings 32 in this embodiment) is disposed between the housing member 10 and the piston 27.

The connector 28 and the plate 29 are accommodated in the housing member 11. The plate 29 is disposed adjacent to and in contact with one of the non-rotatable brake discs 24 that forms the other end of the disc stack adjacent to the piston 27. The connector 28 is disposed at a position between the piston 27 and the plate 29. The connector 28 is comprised of a metal (e.g., a steel pipe). The plate 29 is comprised of a metal (e.g., a material same as the material of the connector 28). The connector 28 and the plate 29 are fabricated integrally by way of soldering, forging, or the like. The plate 29 is secured to one end of the connector 28 and expands therefrom in a radial direction of the connector 28.

The piston 27 and the connector 28 are formed separately from each other. A whole length of the connector 28 is longer than that of the piston 27 in the axial direction of the axle shaft 3. The whole length of the connector 28 may be equal to or shorter than that of the piston 27.

A diameter of an outer peripheral surface of the connector 28 (i.e., an outer diameter of the connector 28) is smaller than a diameter of an outer peripheral surface of the piston 27 (i.e., the outer diameter of the piston 27). Specifically, the outer diameter of the connector 28 is smaller than an outer diameter of an inner end of the piston 27 opposite the connector 28 in the axial direction of the axle shaft 3 with respect to the forklift truck (i.e., the smallest outer diameter of the piston 27).

A diameter of an outer peripheral surface of the plate 29 (i.e., an outer diameter of the plate 29) is greater than the outer diameter of the piston 27. The outer peripheral surface of the plate 29 is located outward of a bottom of the mounting groove 31 in a radial direction of the mounting groove 31. This configuration secures a sufficient area of contact between the plate 29 and its adjacent non-rotatable brake disc 24, thereby enabling the wet brake 6 to generate a desired braking force. The outer peripheral surface of the plate 29 may be located at a position corresponding to or radially inward of a position of the bottom of the mounting groove 31.

The wet brake 6 further includes a first elastic member and a second elastic member. In this embodiment, the first elastic member and the second elastic member are coil springs, more specifically, a plurality of coil springs 33 and a plurality of coil springs 34, respectively. The coil springs 33 are configured to urge the piston 27 in a direction away from the non-rotatable and the rotatable brake discs 24, 25, in other words, in a direction away from the outer end of the axle shaft 3. The coil springs 34 are configured to urge the plate 29 in the direction away from the non-rotatable and the rotatable brake discs 24, 25, in other words, in the direction away from the outer end of the axle shaft 3. The coil springs 33 are arranged in a circumferential direction of the piston 27 in an outer peripheral region of an end surface of the piston 27 that is outwardly oriented in the axial direction of the axle shaft 3 with respect to the forklift truck. The coil springs 34 are arranged in a circumferential direction of the plate 29 in an outer peripheral region of the plate 29.

Figure 3:
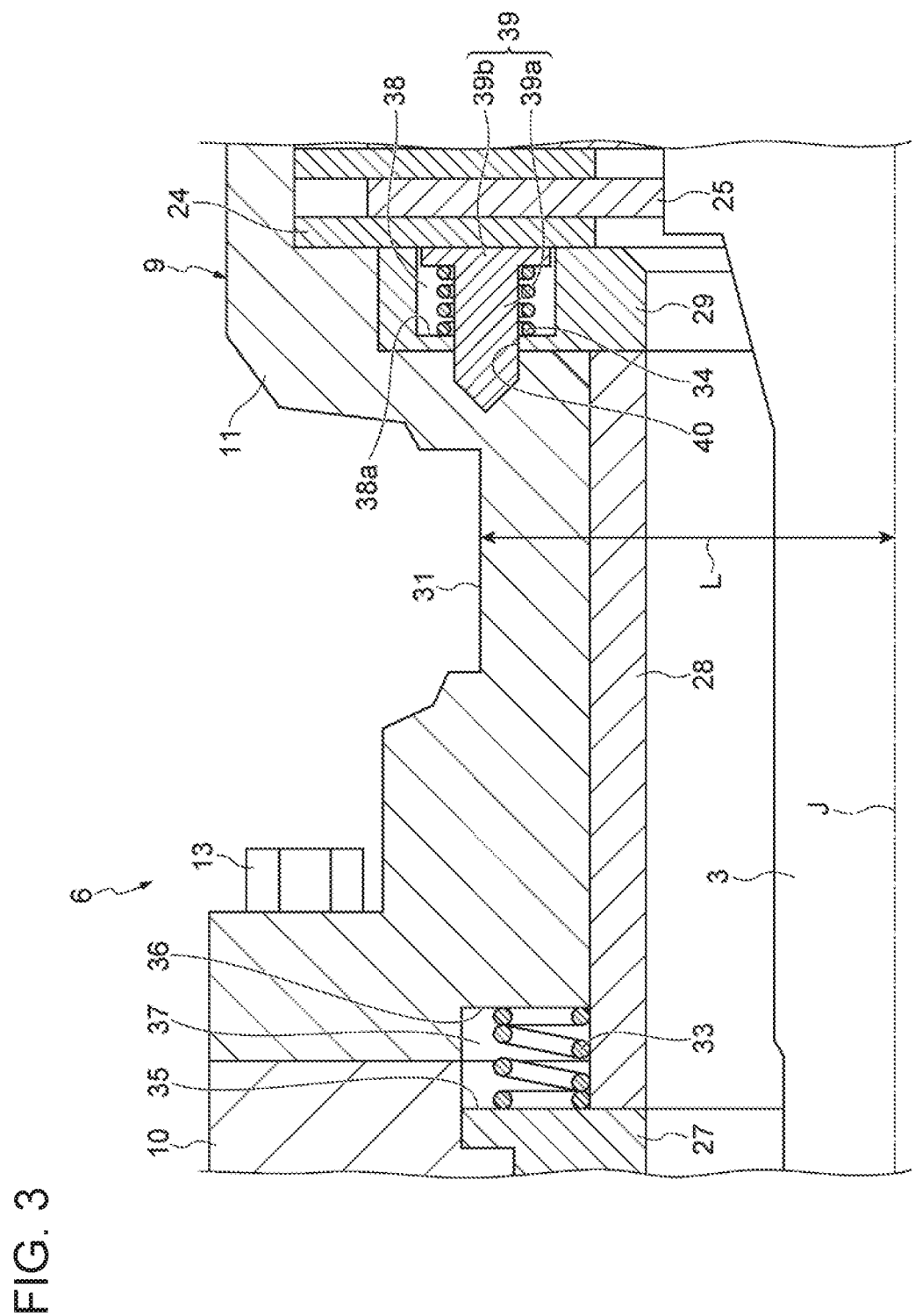
FIG. 3 is an enlarged sectional view of the wet brake of FIG. 1.

As shown in FIG. 3, the housing member 10 has cutouts 35 at an outer end thereof that faces the housing member 11 in the axial direction of the axle shaft 3 with respect to the forklift truck. The housing member 11 has cutouts 36 at an inner end thereof that faces the housing member 10 in the axial direction of the axle shaft 3 with respect to the forklift truck. The cutouts 35, 36 cooperate to form spring accommodation spaces 37 to accommodate the coil springs 33. More specifically, each spring accommodation space 37 is defined by the housing members 10, 11, the piston 27, and the connector 28. The coil springs 33 are interposed between the piston 27 and the housing member 11.

As shown in FIG. 3, the plate 29 has spring accommodation recesses 38 and holes 40. The spring accommodation recesses 38 each accommodate the corresponding coil spring 34. The holes 40 each receive a shank 39a of a screw 39. Each spring accommodation recess 38 opens on one surface of the plate 29 outwardly oriented in the axial direction of the axle shaft 3 with respect to the forklift truck. Each hole 40 is formed through the other surface of the plate 29 and communicates with the spring accommodation recess 38. The shank 39a of the screw 39 is screwed into the housing member 11 through the hole 40. Each coil spring 34 is interposed between a screw head 39b of the screw 39 and a bottom surface 38a of the spring accommodation recess 38.

In this embodiment, the parking lever 26 is configured to push the piston 27 toward the outer end of the axle shaft 3 against an urging force generated by the coil springs 33, in other words, toward the non-rotatable and the rotatable brake discs 24, 25, in response to a pressing operation of the parking brake (not shown). The piston 27 is configured to push the connector 28 and therefore push the plate 29 toward the outer end of the axle shaft 3 against the urging force generated by the coil springs 34. The plate 29 is configured to push the non-rotatable and the rotatable brake discs 24, 25 toward the outer end of the axle shaft 3, so that the non-rotatable and the rotatable brake discs 24, 25 are compressed between the plate 29 and the retainer 8. This configuration applies a brake to the axle shaft 3, thereby restraining rotation of the wheel (not shown).

In response to a release operation of the parking brake (not shown), the parking lever 26 is restored to its original position. The urging force of the coil springs 33 restores the piston 27 to its original position. The urging force of the coil springs 34 restores the connector 28 and the plate 29 to their original positions. Accordingly, the plate 29 and the retainer 8 release the non-rotatable and the rotatable brake discs 24, 25 to release the brake on the axle shaft 3.

When a brake pedal (not shown) disposed in the driver's section is pressed, in response to an pressing operation of the brake pedal, the piston 27 is pushed by hydraulic pressure toward the outer end of the axle shaft 3 against the urging force of the coil springs 33 to apply a brake to the axle shaft 3, as well as in response to the pressing operation of the above-mentioned parking brake.

Figure 4:
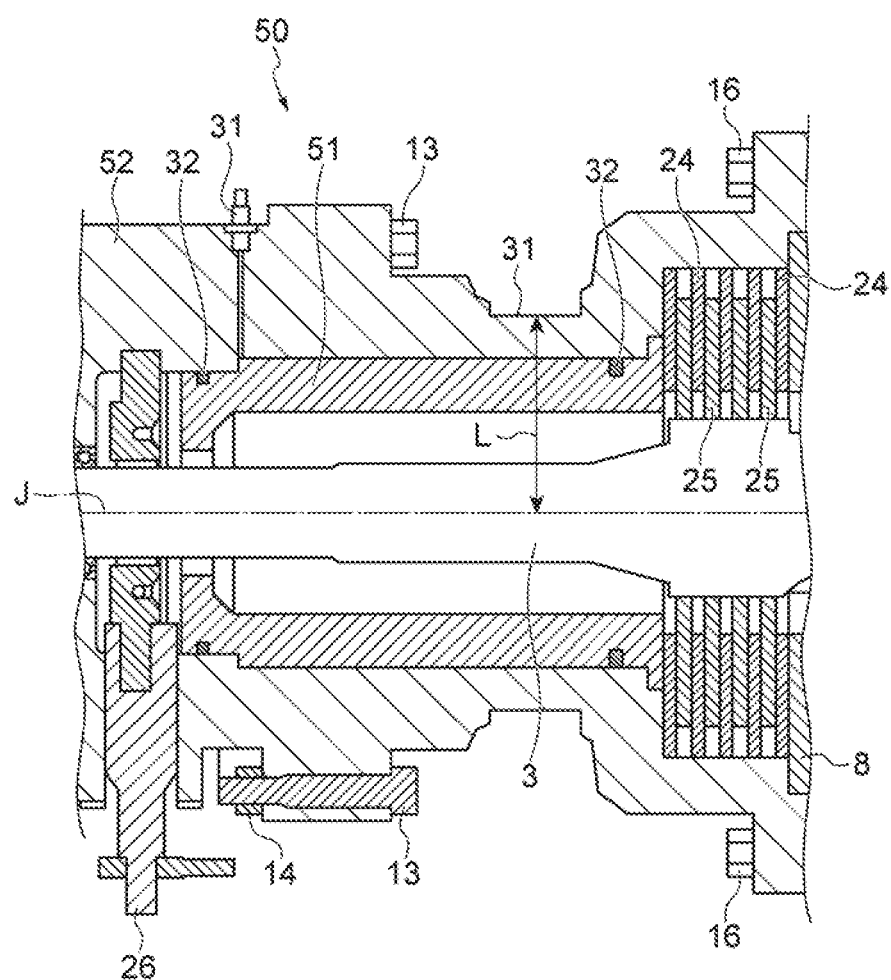
FIG. 4 is a sectional view of a wet brake according to a comparative example.

FIG. 4 is a sectional view of a wet brake according to a comparative example. Referring to FIG. 4, a wet brake 50 includes a piston 51 configured to directly press its adjacent non-rotatable brake disc 24 that forms the end of the disc stack of the non-rotatable and the rotatable brake discs 24, 25. That is, the wet brake 50 does not include a connector and a plate such as the connector 28 and the plate 29. In the wet brake 50, the non-rotatable brake discs 24, the rotatable brake discs 25, and the piston 51 are accommodated in a housing 52 that is fabricated as a single integral component. The housing 52 has the mounting groove 31 that has an annular shape and is formed in the outer peripheral surface of the housing 52 to receive the mast support 19 (see FIG. 2) of the mast 18.

The wet brake 50 configured as desried above may have a problem. Specifically, to achieve a desired braking force, the wet brake 50 needs a large outer diameter of the piston 51 to secure a certain area of contact between the piston 51 and its adjacent non-rotatable brake disc 24. To expand the outer diameter of the piston 51 while securing a certain wall thickness of the housing 52 to maintain its strength, it is necessary to extend a distance L between an axis J of the axle shaft 3 and the mounting groove 31 (FIG. 4). This causes the dimensional change of the mast support 19 and therefore causes the design change of the mast 18 that is also used for dry brakes. In this case, it is necessary to design dedicated mast supports for wet brakes, which disenables sharing of masts and mast supports between forklift trucks having a wet brake and forklift trucks having a dry brake.

To solve this problem, the wet brake 6 in the embodiment of the present disclosure includes the piston 27, the plate 29, and the cylindrical connector 28. The piston 27 is configured to be pushed by the parking lever 26 toward the non-rotatable and the rotatable brake discs 24, 25. The plate 29 is disposed in contact with one of the non-rotatable brake discs 24 that forms the end of the disc stack adjacent to the piston 27. The connector 28 is disposed at a position between the piston 27 and the plate 29. In the wet brake 6, the mounting groove 31, which is configured to receive the mast support 19, is formed in the outer peripheral surface of the housing 9 at a position corresponding to the position of the connector 28. The outer diameter of the connector 28 is smaller than that of the piston 27. This configuration secures the wall thickness of the housing 9 at a region in which the mounting groove 31 is formed, thereby enabling the outer diameter of the piston 27 to be expanded without the extension of the distance L between the axis J of the axle shaft 3 and the mounting groove 31 (see FIG. 3). The dimensional change of the mast support 19 is not necessary, and the mast 18 can be shared between forklift trucks having a dry brake and forklift trucks having a wet brake without any design change of the mast 18. Accordingly, this configuration allows a change in the outer diameter of the piston 27 without making any influence on design of the mast support 19.

In the embodiment of the present disclosure, the piston 27 is accommodated in the housing member 10. The connector 28 and the plate 29 are accommodated in the housing member 11. The mounting groove 31 is formed in the outer peripheral surface of the housing member 11. This configuration enables the outer diameter of the piston 27 in the housing member 10 to be determined without a constraint on the wall thickness of the housing member 11 in which the mounting groove 31 is formed.

In this embodiment, the housing 9 includes the housing members 10, 11 such that the housing 9 is dividable into the housing members 10, 11. This configuration enables individual and easy processing of the housing members 10, 11 as compared to processing of housing members formed integrally with the housing 9. In this embodiment, the piston 27 is provided together with the connector 28. This configuration enables the piston 27 to be designed shorter and more lightweight than the piston 51 of the wet brake 50 of the comparative example that is configured to directly press its adjacent non-rotatable brake disc 24 without using any connector, thereby enabling easy processing of the piston 27.

The wet brake 6 in the embodiment of the present disclosure includes the coil springs 33, 34. The coil springs 33 are configured to urge the piston 27 in the direction away from the non-rotatable and the rotatable brake discs 24, 25. The coil springs 34 are configured to urge the plate 29 in the direction away from the non-rotatable and the rotatable brake discs 24, 25. This configuration ensures that the piston 27, the connector 28, and the plate 29 are restored to their original positions in response to release of the piston 27 by the parking lever 26.

The present disclosure is not limited to the above-described embodiment. For example, in the above-described embodiment, one of the non-rotatable brake discs 24 forms the end of the disc stack of the discs 24, 25 adjacent to the piston 27 such that the plate 29 is disposed adjacent to and in contact with the end-located non-rotatable brake disc 24. However, one of the rotatable brake discs 25 may form the end of the disc stack adjacent to the piston 27 such that the plate 29 is disposed adjacent to and in contact with the end-located rotatable brake disc 25.

In the embodiment of the present disclosure, the connector 28 is formed integrally with the plate 29 and formed separately from the piston 27. However, the connector 28 may be formed integrally with the piston 27 and formed separately from the plate 29. In this case, the piston 27 and the connector 28 may be accommodated in the housing member 10, and the plate 29 may be accommodated with the non-rotatable and the rotatable brake discs 24, 25 in the housing member 11. The piston 27, the connector 28, and the plate 29 may be formed integrally as a single integral component. Alternatively, the piston 27, the connector 28, and the plate 29 may be formed individually.

In the embodiment of the present disclosure, the housing 9 includes the housing members 10, 11 such that the housing 9 is dividable into the housing members 10, 11. However, the housing 9 may be fabricated as a single component.

In the above-embodiment, the housing 9 (i.e., the housing members 10, 11 of the wet brake 6) has the mounting groove 31 that is configured to receive the mast support 19 provided to the bottom part of the mast 18 of the forklift truck. However, the wet brake of present disclosure is also applicable to any vehicles other than forklift trucks. When the wet brake of the present disclosure is applied to a vehicle other than forklift trucks, a housing of the wet brake has a recess or the like that is configured to receive a mounted object of the vehicle.

What is claimed is:

1. A wet brake for restraining rotation of a rotary shaft, the wet brake comprising:
   a housing having a recess that is configured to receive a mounted object, the housing accommodating the rotary shaft;
   a plurality of non-rotatable brake discs disposed in engagement with the housing;
   a plurality of rotatable brake discs disposed in engagement with an outer peripheral surface of the rotary shaft, the rotatable brake discs being interleaved with the non-rotatable brake discs in an axial direction of the rotary shaft and cooperating with the non-rotatable brake discs to form a disc stack;
   a parking lever;
   a piston accommodated in the housing and configured to be pushed by the parking lever toward the non-rotatable and the rotatable brake discs;
   a plate accommodated in the housing and disposed in contact with one of the non-rotatable brake discs or one of the rotatable brake discs, the non-rotatable brake disc or the rotatable brake disc forming one end of the disc stack adjacent to the piston; and
   a connector having a cylindrical shape and accommodated in the housing, the connector being disposed at a position between the piston and the plate, wherein
   the recess is formed in an outer peripheral surface of the housing at a position corresponding to the position of the connector, and
   an outer diameter of the connector is smaller than an outer diameter of the piston.

2. The wet brake according to claim 1, wherein
   the housing includes a first housing member and a second housing member such that the housing is dividable into the first housing member and the second housing member,
   the first housing member and the second housing member are arranged in the axial direction of the rotary shaft,
   the non-rotatable brake discs are disposed in engagement with the second housing member,
   the piston and the connector are formed separately from each other,
   the piston is accommodated in the first housing member,
   the plate and the connector are accommodated in the second housing member, and
   the recess is formed in an outer peripheral surface of the second housing member.

3. The wet brake according to claim 2, wherein
   the wet brake further comprises a first elastic member and a second elastic member,
   the first elastic member is configured to urge the piston in a direction away from the non-rotatable and the rotatable brake discs, and
   the second elastic member is configured to urge the plate in the direction away from the non-rotatable and the rotatable brake discs.

* * * * *